United States Patent

Lacourcelle

[11] Patent Number: 5,966,975
[45] Date of Patent: Oct. 19, 1999

[54] METHOD AND DEVICE FOR ZINC PLATING A SPARK EROSION WIRE, AND WIRE OBTAINED IN THIS WAY

[75] Inventor: Louis Lacourcelle, Saint Jean de la Blaquiere, France

[73] Assignee: Thermocompact Societe Anonyme, Metz Tessy, France

[21] Appl. No.: 08/869,178

[22] Filed: Jun. 4, 1997

[30] Foreign Application Priority Data

Jun. 4, 1996 [FR] France .................................. 96 07026

[51] Int. Cl.⁶ ..................................................... B21B 45/00
[52] U.S. Cl. ............................................. 72/46; 219/69.12
[58] Field of Search ........................ 72/46, 47; 219/150, 219/69.12, 69.15, 155, 156

[56] References Cited

U.S. PATENT DOCUMENTS

| | | | |
|---|---|---|---|
| 1,902,493 | 3/1933 | Dantsizen | ..................................... 72/46 |
| 3,391,450 | 7/1968 | Bauer . | |
| 4,169,426 | 10/1979 | Kornmann et al. . | |
| 4,287,404 | 9/1981 | Convers et al. . | |
| 4,714,626 | 12/1987 | Poncelet et al. . | |

FOREIGN PATENT DOCUMENTS

| | | |
|---|---|---|
| 0193422 | 9/1986 | European Pat. Off. . |
| 391448 | 6/1908 | France . |
| 1526442 | 9/1968 | France . |
| 2261348 | 9/1975 | France . |
| 2418699 | 9/1979 | France . |
| 888791 | 9/1953 | Germany . |
| 655265 | 4/1986 | Switzerland . |
| 1428339 | 3/1976 | United Kingdom . |

OTHER PUBLICATIONS

Patent Abstracts of Japan, Publication No. 63123525, Publication Date May 27, 1988, Applicant: Kogyo KK, Method and Apparatus for Continuously Producing Line.

*Primary Examiner*—Rodney Butler
*Attorney, Agent, or Firm*—Ratner & Prestia

[57] ABSTRACT

A conductor wire is passed through a bath of molten metal in a container. While it is passing through the bath of molten metal, the wire is heated by the Joule effect by an electric current produced by a current source. This improves the adhesion of the metallic surface layer deposited on the core of the wire, so that the wire can be drawn directly by dies downstream of the bath of molten metal. This provides a fast and low-cost method of manufacturing a spark erosion electrode wire.

12 Claims, 1 Drawing Sheet ically deposited by an electrolytic deposition step followed by a wire drawing step. A method of this kind has the drawback of producing an electrode wire with a surface layer that vaporizes too quickly and provides insufficient protection of the core during spark erosion.

METHOD AND DEVICE FOR ZINC PLATING A SPARK EROSION WIRE, AND WIRE OBTAINED IN THIS WAY

BACKGROUND OF THE INVENTION

1. Field of the Invention

The present invention concerns the wire electrodes used in the machining of metal parts by the spark erosion process.

2. Description of the Prior Art

In such machining, as described in document FR-A-2 418 699, for example, a wire electrode is driven in longitudinal translation and a portion of said wire is guided and stretched along a straight line segment that is displaced laterally along a path near a metal part to be machined. An electrical generator produces a potential difference between the part to be machined and the metal wire forming the electrode. Machining occurs in the machining area between the electrode wire and the metal part and progressively erodes the part and the wire.

It has been a long-standing aim to improve the qualities of spark erosion electrode wire by combining good mechanical tensile strength, good electrical conductivity of the wire and more regular production of erosive sparks in the machining area between the electrode wire and the part to be machined.

For example, document U.S. Pat. No. 4,287,404 describes a method and a device for manufacturing a spark erosion electrode wire having a filamentary core surrounded by a layer of metal having a low boiling point, such as zinc, cadmium, tin, lead, antimony or bismuth. The metallic surface layer is deposited by an electrolytic deposition step followed by a wire drawing step. A method of this kind has the drawback of producing an electrode wire with a surface layer that vaporizes too quickly and provides insufficient protection of the core during spark erosion.

It has been found advantageous to heat the wire after electrolytic deposition of the surface layer of metal having a low boiling point, as taught in document EP-A-185 492, in order to produce a diffused alloy. However, a method of this kind cannot produce at high speed an electrode wire having a thick surface layer of diffused alloy.

Document U.S. Pat. No. 4,169,426 describes another method of manufacturing a spark erosion electrode wire having a filamentary core surrounded by a metal layer in which an input conductive wire is passed continuously through a bath of molten metal, after which the wire is rapidly cooled to avoid the formation of intermetallic compounds at the interface between the filamentary core and the metallic surface layer. The wire is then heat treated at 320° C. for several minutes before it is drawn down to the required final diameter. A method of this kind also has the drawback that it is slow, in particular because of the heat treatment time needed to enable subsequent wire drawing without damaging the metallic surface layer.

Document CH-A-655 265 proposes to preheat the input conductive wire by the Joule effect, by passing an appropriate electric current through it, before it is passed through a bath of molten metal. The aim is to increase the speed of manufacture of the spark erosion wire. On leaving the bath of molten metal, the wire is cooled rapidly to prevent the formation of intermetallic compounds at the interface between the core and the coating. The wire can then be drawn down to the required final diameter. This document clearly teaches that the wire drawing is possible because no intermetallic compounds are formed at the interface between the core and the coating.

However, it is very difficult to carry out wire drawing afterwards without seriously damaging the metallic surface layer. This layer tends to become detached from the core because of the mechanical stresses applied by the wire drawing die.

Documents U.S. Pat. No. 3,391,450 and FR-A-1 526 442 describe a combined method of annealing and tinning a copper wire in which the annealing is done by passing an electric current through the wire before, during and after its passage through a bath of molten tin at a relatively low temperature, the wire being heated by the current to a temperature close to that of the bath of molten tin. There is no mention of wire drawing, of applications to spark erosion or of problems with adhesion of the metallic surface layer.

The problem addressed by the present invention is therefore that of designing simple and inexpensive means for improving the adhesion of the metallic surface layer to the filamentary core in a fast method of manufacturing spark erosion electrode wire passing continuously through a bath of molten metal in order to enable subsequent drawing of the wire without significant damage to the metallic surface layer. The aim is thus to produce at high speed a spark erosion electrode wire having a thick surface layer of diffused alloy.

The invention stems from the surprising observation that the adhesion of the metallic layer to the central core is considerably improved if the wire is heated sufficiently by the Joule effect during its passage through the bath of molten metal.

This goes directly against the teaching of documents U.S. Pat. No. 4,169,426 and CH-A-655 265 which recommend minimal heating of the filamentary core to prevent the formation of intermetallic compounds at the interface between the core and the metallic surface layer.

SUMMARY OF THE INVENTION

Accordingly, to achieve the above and other objectives, the invention proposes a method of manufacturing a spark erosion electrode wire having a filamentary core surrounded by a metallic layer wherein an inlet conductor wire is caused to pass continuously through a bath of molten metal having low melting and boiling points, after which the wire is cooled and drawn to the required diameter, and, while it is passing through the bath of molten metal, the wire is heated by the Joule effect by causing an appropriate electric current to flow through the wire section passing through the bath of molten metal.

In one advantageous embodiment, heating of the wire by the Joule effect is continued after the wire leaves the bath of molten metal by passing an electric current through an appropriate section of the wire downstream of the bath of molten metal.

Good results are also obtained by further preheating the wire by the Joule effect by passing an electric current through an appropriate section of the wire upstream of the bath of molten metal.

For simplicity, the electric current flowing through the upstream section and/or the downstream section of the wire can be the same as the electric current flowing through the bath of molten metal.

The method applies to a bath of molten zinc or zinc alloy, for example.

The zinc alloy can contain aluminum or copper, for example.

A device for manufacturing a spark erosion electrode wire having a filamentary core surrounded by a metallic layer, using a method of the above kind, comprises:

a container adapted to contain a bath of molten metal and to enable a conductive wire to be passed continuously through the bath of molten metal, wire guide and drive means for guiding the wire and driving it through the bath of molten metal, means for extruding the wire downstream of the container of the bath of molten metal, a source of electric current and conductors coming into contact with the wire upstream and downstream of the container of the bath of molten metal to pass an appropriate electric current through the wire while it is passing through the bath of molten metal in order to heat said wire by the Joule effect.

Other objects, features and advantages of the present invention will emerge from the following description of particular embodiments given with reference to the accompanying drawings.

DETAILED DESCRIPTION OF THE PREFERRED EMBODIMENT

Figure 1:
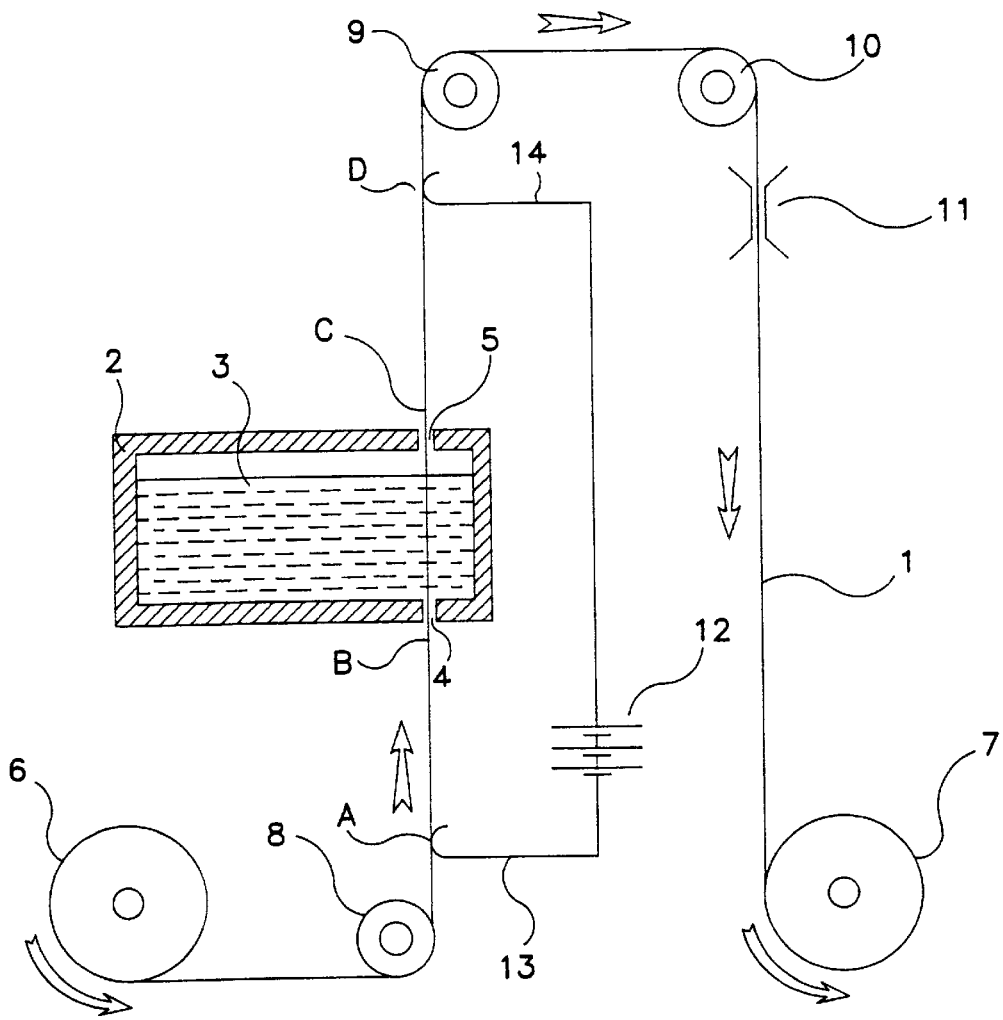
FIG. 1 is a diagrammatic representation of a device for producing a spark erosion electrode wire in one embodiment of the present invention.

In the embodiment shown in FIG. 1, a device of the invention for manufacturing a spark erosion electrode wire 1 includes a container 2 adapted to contain a bath 3 of molten metal. Heating means, not shown, maintain the bath at an appropriate temperature to keep the metal molten during the manufacture of the wire 1. The container 2 has an inlet orifice 4 and an outlet orifice 5 to enable a conductive wire to pass continuously through the bath 3 of molten metal, preferably in the upward direction.

Means for guiding and driving the wire guide the wire 1 and drive it in continuously longitudinal translation through the bath 3 of molten metal. For example, the wire 1 is delivered from an upstream spool 6 to a downstream spool 7, passing over jockey pulleys 8, 9 and 10 and through the bath 3 of molten metal between the inlet orifice 4 and the outlet orifice 5 of the container 2.

The device further includes one or more dies 11 for extruding the wire 1 after it passes through the container 2 and before it is wound onto the downstream spool 7.

The device also includes a source 12 of electric current connected to conductors 13 and 14 coming into contact with the wire 1 at a point A upstream of the container 2 and at a point D downstream of the container 2, respectively. The current source 12 causes an appropriate electric current to flow through the wire 1 as it passes through the bath 3 of molten metal, causing additional heating of the wire 1 by the Joule effect.

The additional heating of the wire 1 by the Joule effect preferably heats the peripheral part of the wire 1 to a sufficiently high temperature to prevent the formation of fragile alloy phases at the interface between the core 16 of the wire and its coating 15. In the case of a copper wire coated with zinc, for example, this avoids the formation of γ, δ or ε phases that can make the interface fragile.

The appropriate electric current can advantageously be such that the wire 1 is substantially at red heat during its passage through the bath 3 of molten metal.

In a first embodiment the upstream point of contact A is in the immediate proximity of the inlet orifice 4 of the container 2 and the downstream contact point D is in the immediate proximity of the outlet orifice 5 of the container 2. In this case, the additional heating of the wire 1 by the Joule effect occurs only in the section BC of the wire passing through the container 2 containing the bath 3 of molten metal.

The contact point D can advantageously be moved away from the outlet orifice 5 of the container 2, to continue the heating of the wire 1 by the Joule effect after it leaves the bath 3 of molten metal, thus causing the electric current to flow in the section CD of the wire downstream of the bath 3 of molten metal. The length of the wire section CD can be chosen to heat the wire for a sufficient time to bring about interdiffusion of the coating metal on the surface and the metal constituting the filamentary core.

In this embodiment, the electric current flowing through the downstream wire section CD is the same as the electric current flowing through the wire section passing through the bath 3 of molten metal. As an alternative to this, an electrical circuit can naturally be designed to pass a different current through the downstream section CD.

The wire can advantageously be preheated by the Joule effect by moving the upstream point of contact A away from the inlet orifice 4. In this way an electric current is caused to flow in an appropriate section AB of the wire upstream of the bath 3 of molten metal.

In this embodiment, the electric current flowing through the upstream wire section AB is the same as the electric current flowing through the wire section passing through the bath 3 of molten metal. Alternatively, electric contacts can be designed to pass a different electric current through the upstream wire section AB.

When a device of this kind from FIG. 1 is in use, an inlet conductive wire wound on the upstream spool 6 is paid off from the upstream spool 6, passes over the first jockey pulley 8 and then comes into contact with the conductor 13 at the point A. The electrical current from the current generator 12 then flows in the upstream wire section AB and heats the wire by the Joule effect so that the wire is already at a high temperature when it enters the container 2 through the inlet orifice 4. As it passes through the container 2 containing a bath 3 of molten metal, the output current of the generator 12 also flows through the wire, said current extending the heating of the wire by the Joule effect. When it passes through the bath 3 of molten metal the wire picks up a surface layer of molten metal. Heating by the Joule effect continues along the downstream section CD, as far as the downstream point of contact D with the conductor 14. The wire then cools, after which it enters the die or dies 11 in which it is extruded to the required final diameter. The extruded wire is wound onto the downstream spool 7.

The electrode wire of the invention is therefore manufactured by passing the wire 1 continuously through a bath 3 of molten metal having a low boiling point and a high vapor pressure, after which the wire is cooled and drawn to the required diameter. While it is passing through the bath 3 of molten metal, the wire is heated by the Joule effect by passing an appropriate electric current through the wire section BC passing through the bath 3 of molten metal. A method of this kind is found to improve significantly the adhesion of the thick metallic surface layer of metal deposited on the core during passage through the bath 3 of molten metal with the result that the metallic surface layer is not damaged on passing through the wire drawing dies 11.

The molten metal in the bath 3 of molten metal can be zinc or zinc alloy.

For example, the molten metal can be an alloy of zinc and at least on other metal such aluminum or copper.

The core of the wire, formed by the inlet conductive wire paid off from the upstream spool 6, can be of copper or copper alloy, for example.

Figure 2:
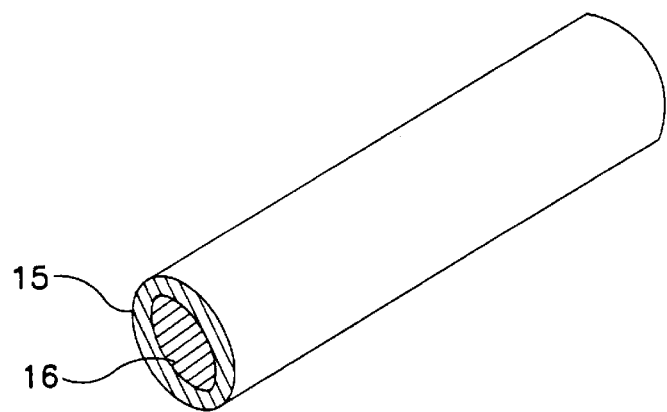
FIG. 2 is a perspective view showing diagramatically a section of spark erosion electrode wire of the invention.

In the embodiment shown in FIG. 2, an electrode wire made by a method as previously described has a thick surface layer 15 of zinc diffused alloy around a core 16. The core 16 can be of copper or copper alloy, for example.

Thanks to the good adhesion of the metallic surface layer to the core, sizing of the wire by the dies 11 can take place at the same speed as the wire passes through the bath 3 of molten metal. This yields a particularly fast and low-cost process for manufacturing a spark erosion electrode wire.

The present invention is not limited to the embodiments that have just be explicitly described, but encompasses the various variants and generalizations thereof contained within the scope of the following claims.

There is claimed:

1. A method of manufacturing a spark erosion electrode wire having a filamentary core surrounded by a metallic layer comprising the steps of:

continuously passing an inlet conductor wire through a bath of molten metal having low melting and boiling points, passing a sufficient amount of electric current through a wire section to heat said wire section by the Joule effect, while said wire section is passing through said bath of molten metal, and cooling and drawing said wire to the required diameter after passing through said bath of molten metal.

2. The method claimed in claim 1 wherein heating of said wire by the Joule effect is continued after said wire leaves said bath of molten metal by passing another electric current through another section of said wire downstream of said bath of molten metal.

3. The method claimed in claim 1 wherein said wire is preheated by the Joule effect by passing another electric current through another section of said wire upstream of said bath of molten metal.

4. The method claimed in claim 1 wherein said molten metal is zinc or zinc alloy.

5. The method claimed in claim 1 wherein said sufficient amount of electric current is such that said wire is substantially at red heat while passing through said bath of molten metal.

6. The method in claim 1 including the steps of guiding said wire and driving it through a container for said bath of molten metal, extruding said wire downstream of said container of said bath of molten metal, contacting said wire through a source of electric current and conductors upstream and downstream of said container of said bath of molten metal.

7. The method claimed in claim 2 wherein said other electric current flowing through said other section is the same as the electric current flowing through said wire section passing through said bath of molten metal.

8. The method claimed in claim 3 wherein said other electric current flowing through said other section is the same as said electric current flowing through said wire section passing through said bath of molten metal.

9. The method claimed in claim 4 wherein said molten metal is an alloy of zinc and at least one other metal such as aluminum or copper.

10. The method claimed in claim 6 including the steps of contacting said conductors with said wire upstream and/or downstream at a distance from said container in order to procure further heating by the Joule effect of said wire upstream and/or downstream of its passage through said bath of molten metal.

11. A method of manufacturing a spark erosion electrode wire having a filamentary core surrounded by a metallic layer comprising the steps of:

continuously passing an inlet conductor wire through a bath of molten metal having low melting and boiling points, passing a sufficient amount of electric current through a wire section to heat said wire section by the Joule effect, while said wire section is passing through said bath of molten metal, and cooling and drawing said wire to the required diameter, wherein (a) heating of said wire by the Joule effect is continued after said wire leaves said bath of molten metal by passing another electric current through another section of said wire downstream of said bath of molten metal, and (b) said other electric current flowing through said other section is the same as the electric current flowing through said wire section passing through said bath of molten metal.

12. A method of manufacturing a spark erosion electrode wire having a filamentary core surrounded by a metallic layer comprising the steps of:

continuously passing an inlet conductor wire through a bath of molten metal having low melting and boiling points, passing a sufficient amount of electric current through a wire section to heat said wire section by the Joule effect, while said wire section is passing through said bath of molten metal, and cooling and drawing said wire to the required diameter, wherein (a) said wire is preheated by the Joule effect by passing another electric current through another section of said wire upstream of said bath of molten metal, and (b) said other electric current flowing through said other section is the same as said electric current flowing through said wire section passing through said bath of molten metal.

\* \* \* \* \*